United States Patent [19]
Hung

[11] Patent Number: 6,079,524
[45] Date of Patent: Jun. 27, 2000

[54] AUTOMATIC STOP MECHANISM FOR A ROLLING DOOR

[76] Inventor: Jin-Shan Hung, P.O. Box 63-247, Taichung, Taiwan

[21] Appl. No.: 09/167,144

[22] Filed: Oct. 6, 1998

[51] Int. Cl.⁷ .................................................. B60T 8/72
[52] U.S. Cl. ........................... 188/184; 49/322; 187/314; 188/171; 188/265
[58] Field of Search .............................. 188/74, 265, 171, 188/184, 189, 156, 166; 49/322, 120, 122, 449; 187/314, 315, 373, 305

[56] References Cited

U.S. PATENT DOCUMENTS

| | | | |
|---|---|---|---|
| 3,344,556 | 10/1967 | Edwards ..................................... | 49/360 |
| 4,529,065 | 7/1985 | Kraft ........................................ | 187/314 |
| 4,696,375 | 9/1987 | Matthews et al. ..................... | 49/322 X |
| 5,287,950 | 2/1994 | Feathers et al. ..................... | 188/187 X |
| 5,671,829 | 9/1997 | Rivera ..................................... | 188/171 |
| 5,904,229 | 5/1999 | Timari ................................... | 188/184 X |

Primary Examiner—Robert Oberleitner
Assistant Examiner—Pamela J. Lipka
Attorney, Agent, or Firm—Charles E Baxley, Esq.

[57] ABSTRACT

An automatic stop mechanism for a rolling door includes two brake members mounted to the stop member which is removably engaged with the fixture, the stop member having a flange disengagably contacting the inclined flange to normally stop the rolling door, a handle pivotally connected to the fixture and connected to the first member and the second member so as to shift the stop member along the shaft of the motor, the two brake members each having a brake pad and located within the motor casing, when the rolling door runs downwardly fast and the normal stop mechanism fails, the two brake members are expanded due to the eccentric force to stop the door by the two brake pads contacting the motor casing.

4 Claims, 6 Drawing Sheets

6,079,524

AUTOMATIC STOP MECHANISM FOR A ROLLING DOOR

FIELD OF THE INVENTION

The present invention relates to a stop mechanism, and more particularly, to an automatic stop mechanism for an electrical rolling door, wherein the stop mechanism has two brake members mounted to a stop member and the two brake members will expand outwardly to contact the inside of the motor casing due to eccentric force to stop the rolling door when the motor fails.

BACKGROUND OF THE INVENTION

The rolling door is composed of a plurality of metal sheets which are heavy so that when the rolling door runs downward, a suitable stop mechanism is needed to keep the rolling door running down slowly and stably. Once the normal stop way is functionless, the heavy rolling door running fast could injure people below the door. Therefore, some conventional rolling doors are equipped with an automatic stop mechanism to stop the rolling door when the normal stop mechanism looses its function such as the motor fails. However, these conventional automatic stop mechanisms have a complicated structure and a high price. Furthermore, the conventional automatic stop mechanisms, although can achieve the desired purpose, they are not stable when in use and thus may cause additional problems of the structure of the rolling door such as breaking some parts of the mechanisms.

The present invention intends to provide an automatic stop mechanism which has a simple structure and utilizes the eccentric force when the rolling door runs downward to expand two brake members to stop the door. The structure of the stop mechanism can well mitigate the disadvantages of the conventional stop mechanisms described above.

SUMMARY OF THE INVENTION

The present invention provides an automatic stop mechanism for a rolling door and comprises a motor received in a motor casing and a shaft extends from the motor. A first member is movably mounted to the shaft with a spring biased between the motor and the first member, and the first member has a first serrated end. A stop member is fixedly connected to the first member with the first serrated end of the first member extending centrally through the stop member. Two slots are defined through the periphery of the stop member and two protrusions extend radially inwardly from the stop member which has a flange extending radially outward therefrom.

Two brake members have two respective first ends thereof connected by a spring and two respective second ends thereof having a curved plate. The two brake members each have a brake pad attached thereto and are mounted to the stop member. The two curved plates are engaged with the two protrusions via the two slots with the two brake pads located within the motor casing.

A fixture has an inclined flange extending from the first side thereof and a handle is pivotally connected to the second side of the fixture. The flange of the stop member disengagably contacts the inclined flange of the fixture. A second member extends centrally through the fixture and has a second serrated end which is removably engaged with the first serrated end of the first member. The handle is pivotally connected to the second member so that the second member is shifted when pivoting the handle.

An object of the present invention is to provide an automatic stop mechanism for a rolling door, wherein two brake members are expanded due to the eccentric force when the rolling door runs downwardly to contact the motor casing to stop the door when the normal stop mechanism fails.

Further objects, advantages, and features of the present invention will become apparent from the following detailed description with appropriate reference to the accompanying drawings.

DETAILED DESCRIPTION OF THE PREFERRED EMBODIMENT

Figure 1:
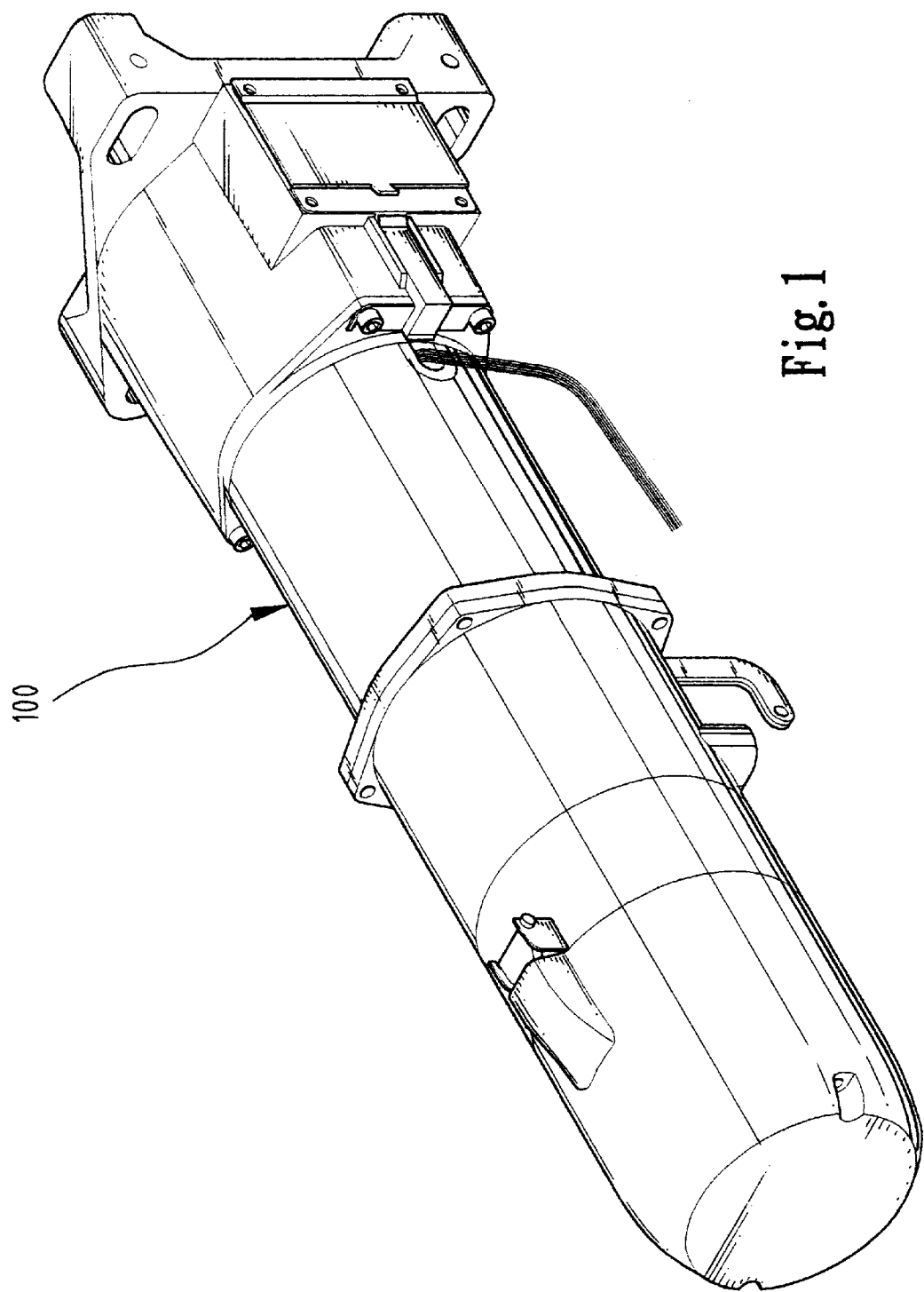
FIG. 1 is a perspective view of the motor casing in which the auto stop mechanism in accordance with the present invention is received.
Figure 2:
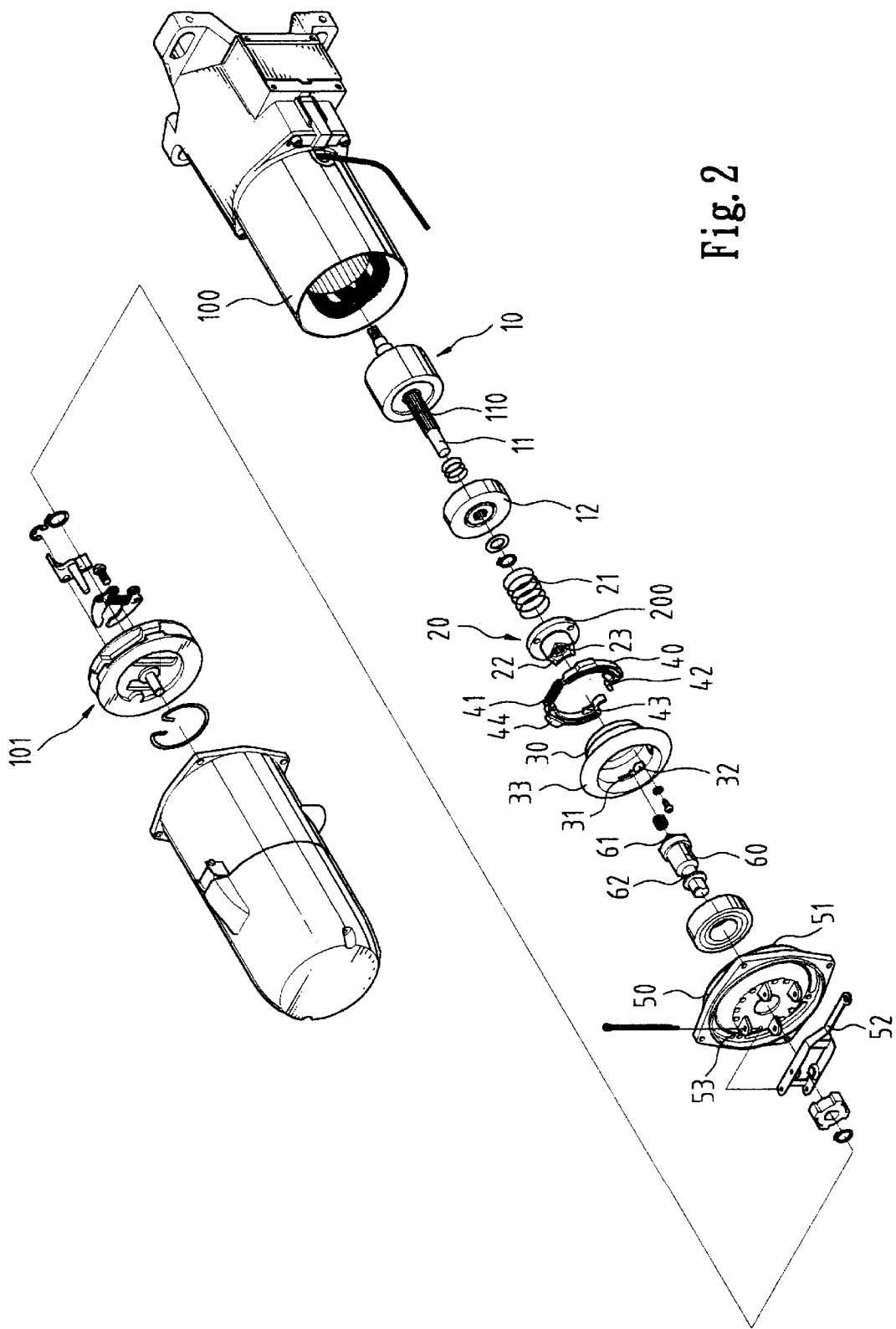
FIG. 2 is an exploded view of the stop mechanism in accordance with the present invention.
Figure 3:
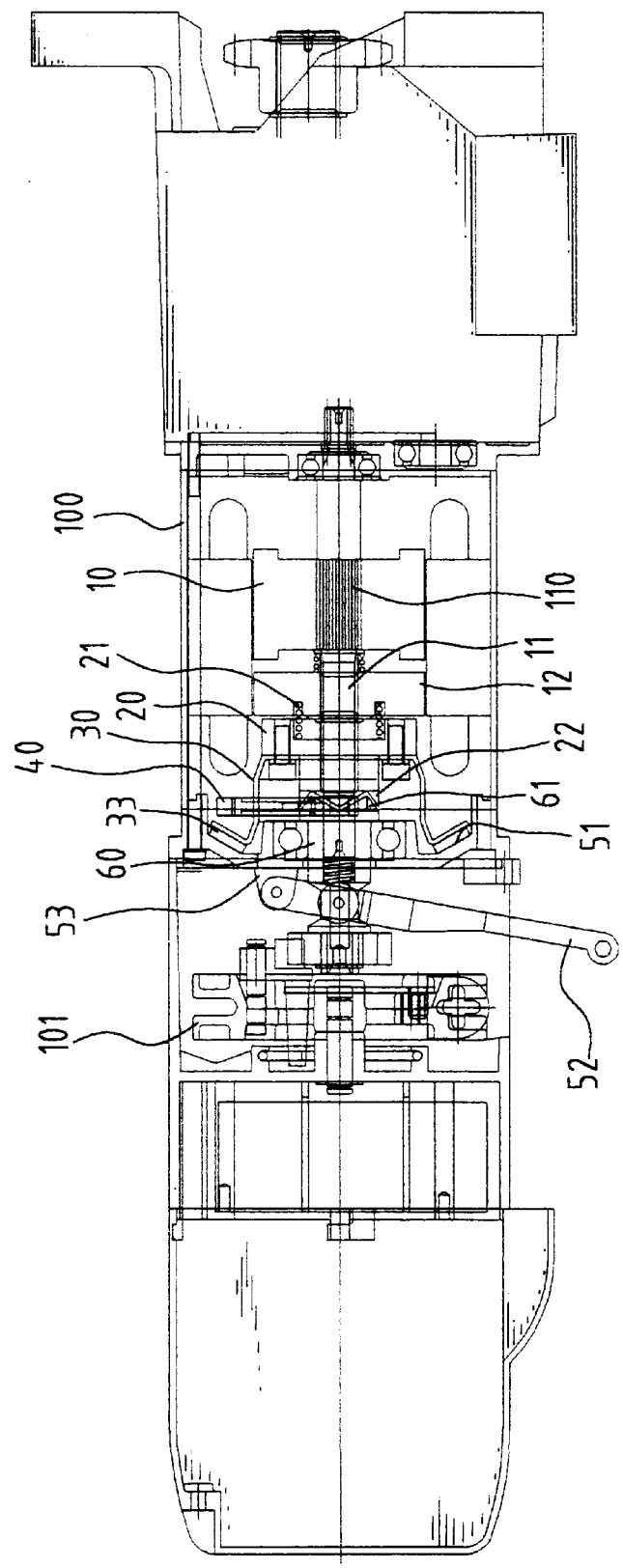
FIG. 3 is a side elevational view, partly in section, of the stop mechanism in accordance with the present invention, when the handle is not yet pivoted.

Referring to FIGS. 1 to 3, the automatic stop mechanism for a rolling door in accordance with the present invention comprises a motor 10 received in a motor casing 100 which has a manual operation mechanism 101 received in one of two ends thereof, the motor 10 has a shaft 11 extending therefrom which has the toothed outer periphery 110. A first member 20 is movably mounted to the shaft 11 with a spring 21 biased between a disk member 12 mounted to the shaft 11 and the first member 20. The first member 20 has a flange 200 extending radially therefrom and a neck with the first serrated end 22. The first member 20 has a toothed inner periphery 23 so as to engage with the toothed outer periphery 110 of the shaft 11. A stop member 30 is fixedly connected to the first member 20 by bolts extending through the stop member 30 and fixedly engaged to the flange 200 of the first member 20. The first serrated end 22 of the first member 20 extends centrally through the stop member 30 which has two slots 31 defined through the periphery thereof and two protrusions 32 extending radially inwardly therefrom. The stop member 30 has a flange 33 extending radially outward therefrom which has a brake lining attached thereto.

Figures 6, 7:
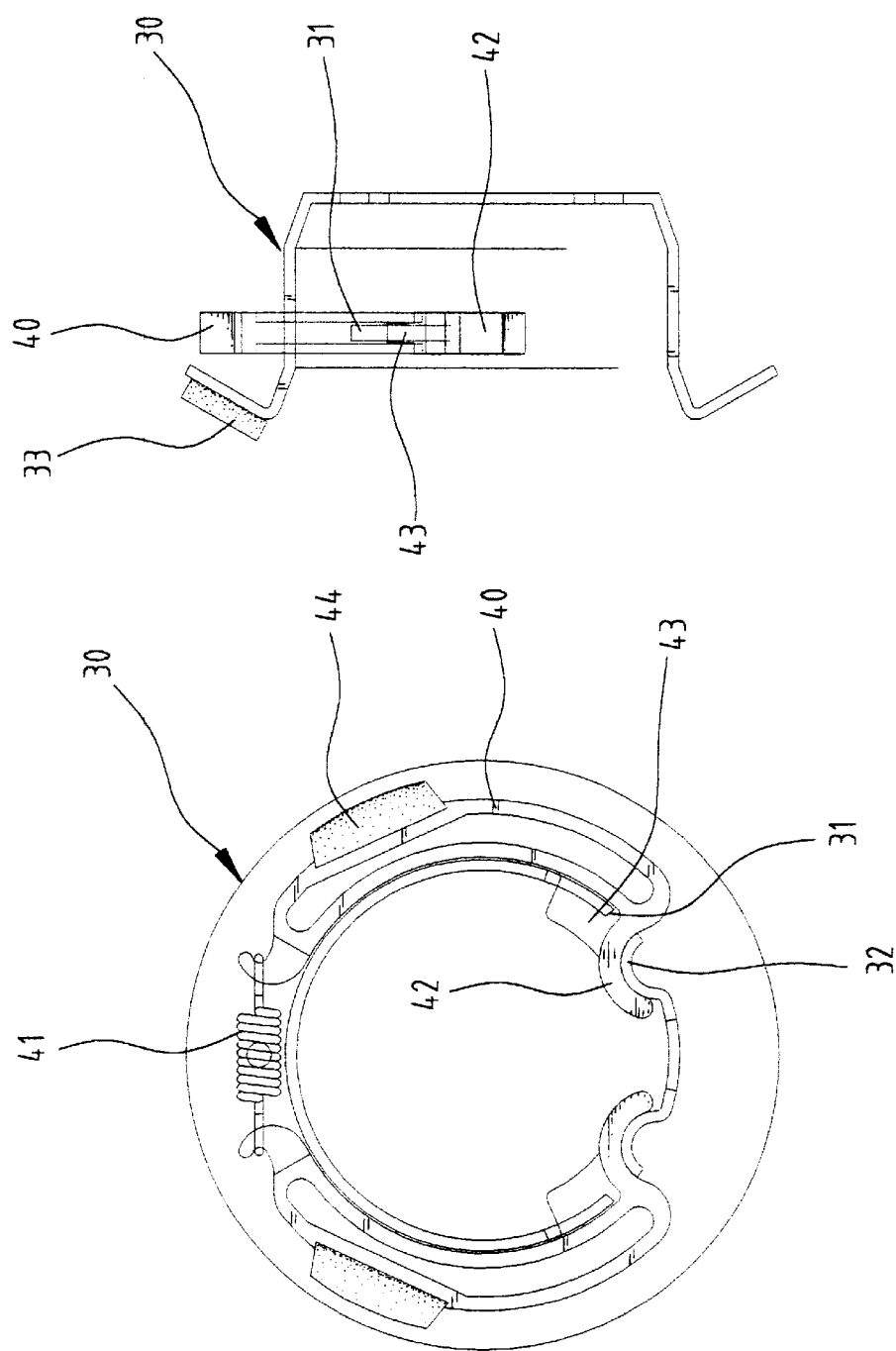
FIG. 6 is an illustrative view to illustrate the engagement between the two brake members and the stop member.
FIG. 7 is a lateral view to show the engagement as shown in FIG. 6.

Further referring to FIGS. 6 and 7, two brake members 40 have two respective first ends thereof connected by a spring 41 and two respective second ends thereof each have a curved plate 42. Each of the brake members 40 has a brake pad 44 attached thereto which are located within the motor casing 100. The two brake members 40 are mounted to the stop member 30 and the two curved plates 42 engaged with the two protrusions 32 via the two slots 31. Each of the two curved plates 42 has a guide plate 43 extending therefrom and the two guide plates 43 are respectively received in the two slots 31 so as to ensure that the two brake members 40 are stably engaged with the stop member 30.

A fixture 50 has an inclined flange 51 extending from the first side thereof so that the brake lining of the flange 33 of the stop member 30 disengagably contacts the inclined flange 51 of the fixture 50, that is to say, the engagement between the brake lining of the flange 33 and the inclined flange 51 is a normal stop mechanism of the rolling door, the stop member 30 is normally pushed toward the fixture 50 by the spring 21 and when the motor 10 is actuated, the stop member 50 will be shifted to remove from the fixture by a magnet force to let the shaft 11 rotate freely. At least two lugs 53 extending from the second end of the fixture 50 so as to pivotally connect to the handle 52.

A tubular second member 60 extends centrally through the fixture 50 and has a second serrated end 61 which is removably engaged with the first serrated end 22 of the first member 20. The second member 60 has an annular groove 62 defined in the end opposite to the second serrated end 61 so as to receive the handle 52 therein such that when pivoting the handle 52, the second member 60 is shifted.

Figure 4:
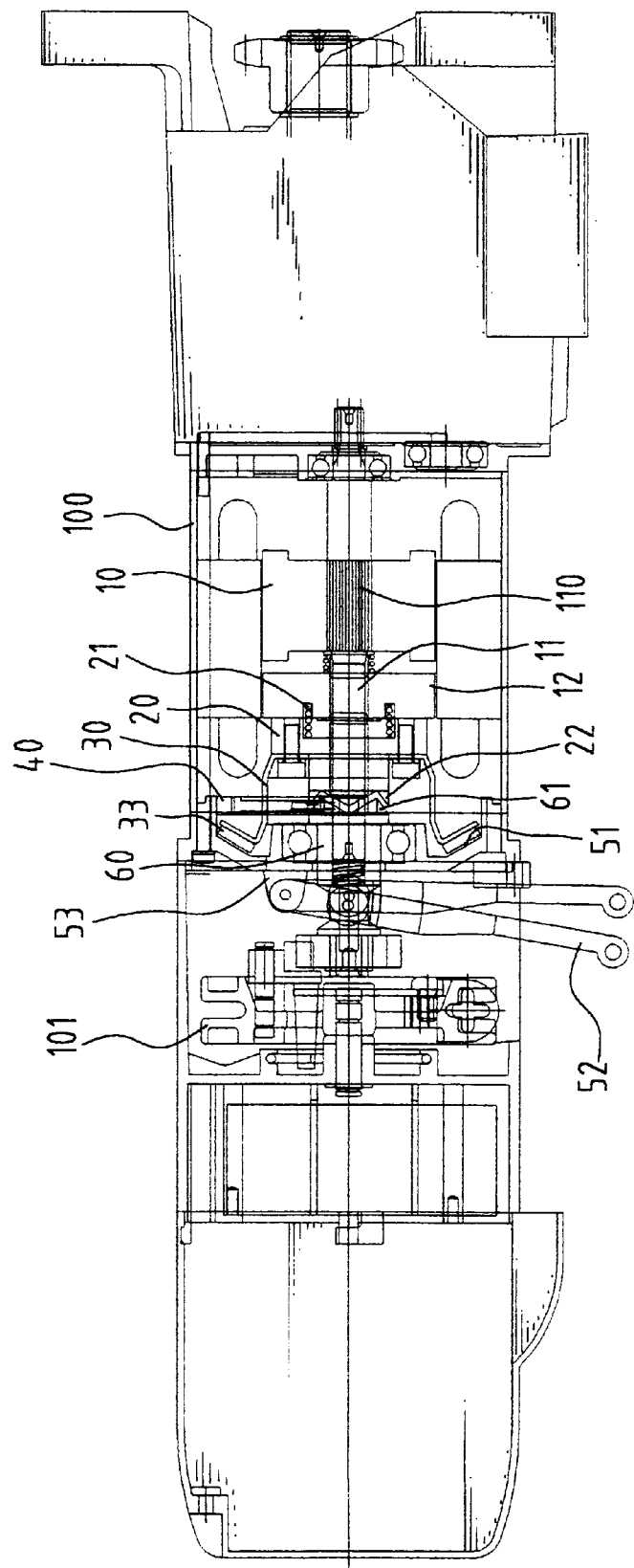
FIG. 4 is a side elevational view, partly in section, of the stop mechanism in accordance with the present invention, when the handle is not yet pivoted.
Figure 5:
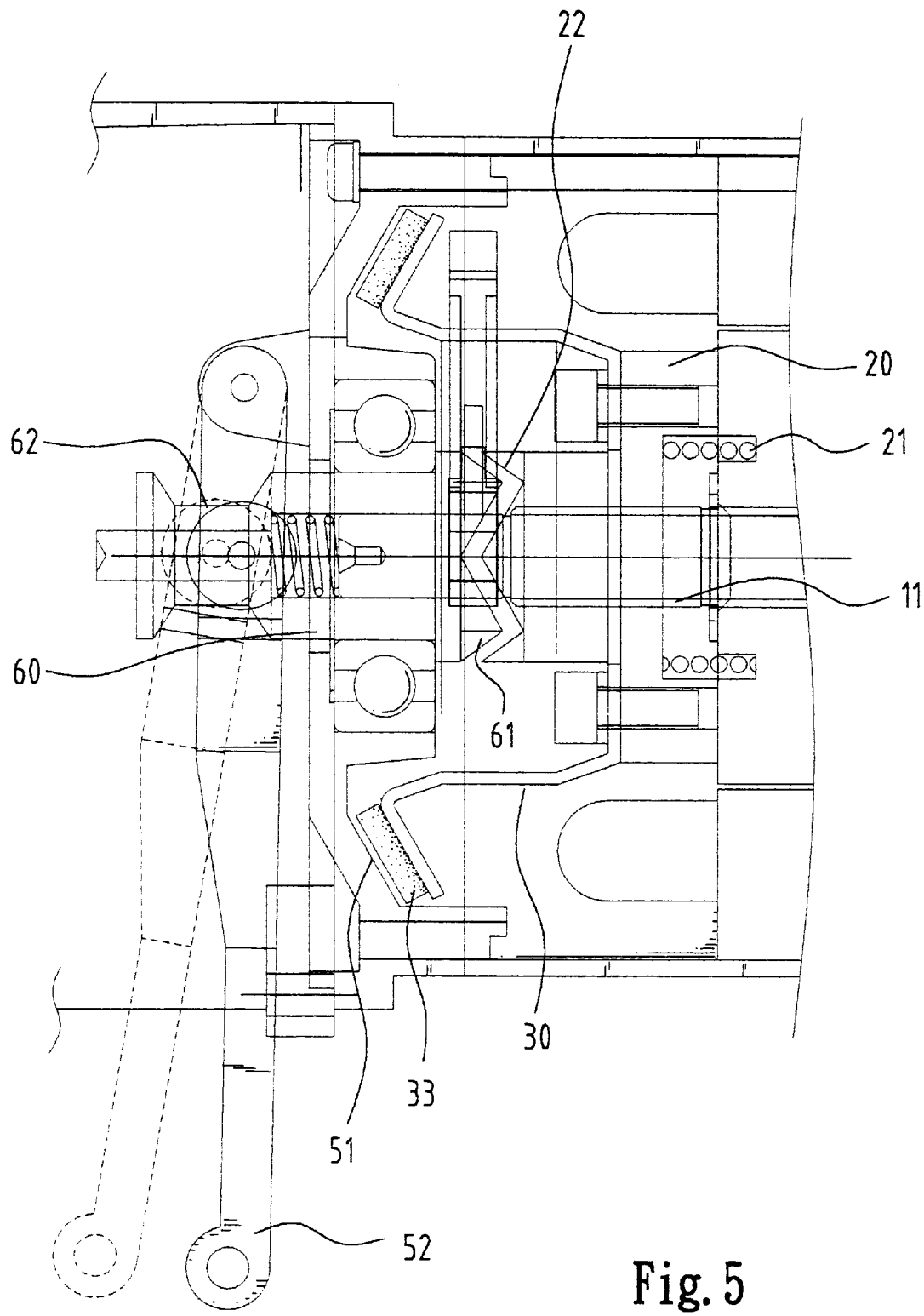
FIG. 5 is a side elevational view, partly in section and in an enlarged scale, of the stop mechanism when the handle is pivoted.

Further referring to FIGS. 4 and 5, when the motor fails, that is to say, when the rolling door runs downwardly, and the stop member 30 cannot be shifted to engage with the fixture to stop the rolling door, the user pivots the handle 52 to push the second member 60 and compress the spring 21 to shift the first member 20 toward the motor 10. The first member 20 together with the stop member 30 are then moved away from the fixture 50, and the rolling door runs freely downwardly. When the speed of the door achieves a predetermined value, the two brake members 40 expand outwardly due to the eccentric force and the two brake pads 44 then contact the inside of the motor casing 100 to stop the rotation of the stop member 30 and the rolling door.

It is to be noted that the two brake members 40 are stably connected to the stop member 30 so that they will not disengage from the stop member 30. The eccentric force to expand the two brake members 40 will be produced as the rolling door runs at a pre-determined speed so that the rolling door will stop automatically without any additional electrical force.

The invention is not limited to the above embodiment but various modification thereof may be made. It will be understood by those skilled in the art that various changes in form and detail may made without departing from the scope and spirit of the present invention.

What is claimed is:

1. An automatic stop mechanism for a rolling door, comprising:

a motor received in a motor casing and having a shaft extending therefrom;

a first member movably mounted to said shaft with a spring biased between said motor and said first member, said first member having a first serrated end;

a stop member fixedly connected to said first member with said first serrated end of said first member extending centrally through said stop member, two slots defined through the periphery thereof and two protrusions extending radially inwardly therefrom, said stop member having a flange extending radially outward therefrom;

two brake members having two respective first ends thereof connected by a spring and two respective second ends thereof each having a curved plate, each of said brake members having a brake pad attached thereto, said two brake members mounted to said stop member and said two curved plates engaged with said two protrusions via said two slots, said two brake pads located within said motor casing;

a fixture having an inclined flange extending from the first side thereof and a handle pivotally connected to the second side of said fixture, said flange of said stop member disengagably contacting said inclined flange of said fixture, and a second member extending centrally through said fixture and having a second serrated end which is removably engaged with said first serrated end of said first member, said handle pivotally connected to said second member so that said second member is shifted when pivoting said handle.

2. The stop mechanism as claimed in claim 1, wherein said second member has an annular groove defined therein so as to receive said handle therein such that when pivoting said handle, said second member is shifted.

3. The stop mechanism as claimed in claim 1, wherein each of said two curved plates has a guide plate extending therefrom and said two guide plates are respectively received in said two slots.

4. The stop mechanism as claimed in claim 1, wherein said first member has a toothed inner periphery and said shaft of said motor has a toothed outer periphery so as to engage with said toothed inner periphery of said first member.

* * * * *